United States Patent [19]

Fry

[11] 4,422,878

[45] Dec. 27, 1983

[54] ASPHALT COMPOSITIONS

[75] Inventor: Frank R. Fry, Newark, Del.

[73] Assignee: Hercules Incorporated, Wilmington, Del.

[21] Appl. No.: 445,115

[22] Filed: Nov. 29, 1982

[51] Int. Cl.$^3$ ............... C08L 91/00; C08L 95/00
[52] U.S. Cl. ................... 106/219; 106/232; 106/235; 106/282; 106/241; 524/59; 524/70; 524/284; 523/200
[58] Field of Search ............. 162/75, 79, 157 R; 106/232, 235, 282, 219, 241; 523/200; 524/60, 284, 322, 59, 70; 428/394, 375, 291

[56] References Cited

U.S. PATENT DOCUMENTS

| | | | |
|---|---|---|---|
| 2,478,162 | 3/1947 | Somer | 106/273 |
| 2,593,010 | 4/1952 | Clarvoe | 162/179 |
| 3,067,087 | 12/1962 | Gorski et al. | 162/179 |
| 3,231,530 | 1/1966 | Prahl | 524/322 |
| 3,505,260 | 9/1967 | Woodruff | 524/60 |
| 3,956,213 | 5/1976 | Hefele | 524/322 |
| 3,985,694 | 8/1974 | Petrucco | 524/68 |
| 4,302,370 | 11/1981 | Buse | 524/68 |

OTHER PUBLICATIONS

Chem. Abstract 73: 89059d Iwai Apr. 24, 1970.

Primary Examiner—Theodore Morris
Attorney, Agent, or Firm—John E. Crowe

[57] ABSTRACT

Paving mixtures are disclosed comprised of paving grade asphalt containing about 4 to 10% by weight of a fibrous filler and 2.5 to 15% by weight of a mixture of eighteen carbon fatty acids containing up to about 30% by weight of rosin.

5 Claims, No Drawings

ASPHALT COMPOSITIONS

This invention relates to the modification of asphalt for use in paving applications. More specifically, it relates to the modification of fiber-reinforced asphalt compositions whereby their performance is substantially improved in several ways.

Thousands of miles of highway exist throughout the world wherein the principal material of construction is asphalt. Thousands of new miles of such highway are built each year. In the roadbed, per se, the asphalt serves as a matrix for gravel or crushed stone. When repairs or resurfacing is effected on such roads, liquid asphalt, usually containing sand, is employed as a filler for cracks and as a waterproofing underlayer between the old road and the new layer to be applied.

In recent years it has been proposed to improve the strength and durability of asphalt sealants by including in the asphalt formulation a fibrous reinforcing material such as glass, asbestos, or synthetic polymer staple. Such fibers, when used in about 6 to 8% concentration based on the weight of asphalt, yield products of substantially increased strength and toughness at temperatures above about −10° C.

Addition of the fibers to asphalt, however, dramatically reduces the pumpability and workability of the composition. In the normal usage of asphalt, the mix is heated to about 130° to 145° C. for application to a roadbed or the like. Upon addition of the requisite 6 to 8% fibers, the composition must be further heated to about 10° higher in order to achieve a workable viscosity. This additional heating is undesirable due to the greater energy requirement and resultant economic disadvantage of reaching the higher temperatures. Moreover, when synthetic staple is employed as the fibrous filler, the higher temperature is likely to induce degradation of the polymer so that the same high degree of strength and durability may not be achieved.

Now, in accordance with this invention, it has been found that the addition of certain fatty acid mixtures to the asphalt/fiber compositions not only eliminates the need to employ higher temperatures to mix and apply the compositions, it permits operation at a lower temperature than the 130°–145° C. which is normally employed. Specifically stated, the invention is an asphalt mix containing about 4 to 10% by weight of a fibrous filler based on the weight of the asphalt and about 2.5 to 15% by weight and inclusive of 2.5 to 10% by weight, based on the total weight of asphalt and fibrous filler, of a mixture comprising mainly straight chain unsaturated eighteen carbon fatty acids containing up to about 30% rosin.

In addition to the processing advantages specified above, the addition of the fatty acid mixture also effects dramatic improvements in low temperature physical properties of fiber-reinforced asphalt compositions. In colder climates, asphalt is marginally acceptable even when fiber-reinforced due to its loss of tensile strength and extreme brittleness (evidenced by low elongation at break) at near or sub-zero temperatures. Snow removal under such conditions can cause severe damage to exposed material. When heavy steel snow plow blades strike the pavement, shattering of the asphalt is a serious problem. With the asphalt compositions of this invention, this problem will be significantly reduced.

The term, eighteen carbon unsaturated fatty acid mixture, is used herein to describe a mixture comprised of about 70 to 100% by weight mono- and di-unsaturated eighteen carbon fatty acids and up to about 30% by weight of rosin, wherein the fatty acid portion consists of about 40 to 50% by weight of di-unsaturated acids. The product recovered by fractional distillation of tall oil recovered from the sulfite pulping process, referred to as "tall oil fatty acids" (see Hackh's Chemical Dictionary, 4th ed., page 660 and Condensed Chemical Dictionary 10th ed., page 992), is a good example of the desired mixture.

The fiber-reinforced asphalt compositions of the invention include neat asphalt, asphalt concrete, i.e., an asphalt-aggregate paving mixture, and crack filler mixtures of asphalt and fines, for example, sand. Substantially any fiber-reinforced paving grade asphalt can be improved by incorporating tall oil fatty acids therein. Paving grade asphalt is a derivative of crude oil refining which has a viscosity at 60° C. between 250 and 4000 poise and a penetration at 25° C. between 20 and 200. Thus, the products of the invention can be employed as road surfaces, per se, as crack and joint filling materials, as interlayer membranes between an old surface and a new surface being laid down thereon, and as a chip seal matrix.

Any of the previously mentioned fibrous fillers, i.e., glass, asbestos, or synthetic polymer staple can be employed as the fibrous filler. The preferred filler is polypropylene staple fiber, partly because of its favorably low price and also because it has a high degree of compatibility with asphalt and long chain fatty acids. Normally, the fibrous filler is added in amounts up to about 10%. For optimum reinforcement, about 4 to 10% by weight polypropylene fiber is used and most preferably, about 6 to 8%.

In a particularly favored way of preparing the asphalt compositions of the invention, the fatty acid mixture is mixed in the desired proportions with polypropylene staple fiber and tumbled until the acid mixture is totally adsorbed on the surface of the fibers. The resultant fibers remain free flowing so that they can readily be fed into a kettle of molten asphalt for distribution therein. On contact with the asphalt, the fatty acids dissolve as the fibers disperse. Using this technique, master batches of treated fibers can be kept on hand for use when the occasion demands.

Since the fibrous filler and the fatty acid mixture are employed in approximately the same concentration ranges in the asphalt, the fiber to fatty acid ratio will be approximately 50/50 in the master batch. Ratios of up to 60 parts fatty acid to 40 parts fiber can be employed and still have a free flowing fibrous product with no free fatty acid. The lower ratio of fatty acid is dictated by the relative concentration ratio required in the asphalt, but will usually be no less than about 30/70.

The improved workability and the lower operable temperature of the compositions of the invention and the improved low temperature physical properties are demonstrated by the following examples.

EXAMPLE 1

A charge of about 100 parts of asphalt having a viscosity of 2000 poise at 60° C. (AC-20) was charged to a kettle and heated to 132° C. To the heated asphalt was added 6 parts of a tall oil fatty acid distillate mixture consisting of approximately 91.5% $C_{18}$ fatty acids (4% saturated, 51% mono-unsaturated and 45% di-unsaturated), 4% rosin acids and 4.5% unsaponifiable impurities. When the acids were completely incorporated, a charge of about 6 parts 3 denier per filament polypropylene staple fiber of about 10 mm length was added. Agitation was continued until the components were homogeneously mixed. (The mix had excellent pumpability and flow at a temperature as low as 123° C.).

Simultaneously with the previous preparation, a similar composition was prepared having the same ratio of polypropylene fibers to asphalt, but no fatty acid mixture. Pumping of this composition was difficult even at 132° C.

EXAMPLES 2 to 10

Films, 85 mil in thickness, of various formulations according to the invention were cast and allowed to harden. Tensile strength and percent elongation were determined on these specimens after storing at −18° C. overnight, using the Instron Tensile Tester.

The procedure for preparation of the films is as follows: (1) various amounts of fatty acid mixtures are added to hot (138° C.) asphalt and mixed until homogeneous; (2) the fiber is added and mixed until completely dispersed into the acid/asphalt mixture; (3) the fiber modified asphalt is poured and distributed into preheated molds and pressed at 138° C. under 4–5 tons for 1–2 minutes; (4) mold and sample are cooled by circulating cold water through the press; and (5) the sample is removed from the mold and cut into 1"×4" strips for physical testing. Results are recorded in Table 1.

TABLE 1

| Example No. | % Fatty Acid Mixture | % Fiber | Asphalt | Properties at −18° C. Elongation At Break | Tensile Strength |
|---|---|---|---|---|---|
| 2 | 4%[1] | 8 | AC-20 | 17.5% | 546 psi |
| 3 | 6%[1] | 8 | AC-20 | 23% | 807 psi |
| 4 | 8%[1] | 8 | AC-20 | 34% | 780 psi |
| 5 | 10%[1] | 8 | AC-20 | 42.1% | 927 psi |
| Control | 0 | 8 | AC-20 | 13% | 452 psi |
| 6 | 10%[2] | 8 | AC-20 | 38% | 787 psi |
| 7 | 10%[3] | 8 | AC-20 | 18.6% | 675 psi |
| Control | 0 | 8 | AC-10[5] | 11.2% | 392 psi |
| 8 | 6%[1] | 8 | AC-10 | 12.6% | 580 psi |
| 9 | 8%[1] | 8 | AC-10 | 19.1% | 505 psi |
| 10 | 8%[1] | 8[4] | AC-20 | 41% | 830 psi |

[1] Fatty acid mixture described in Example 1.
[2] Fatty acid mixture contains 86% fatty acids, 10% resin acids and 4% unsaponifiables.
[3] Fatty acid mixture contains 69% fatty acids, 28% resin acids and 3% unsaponifiables.
[4] Fiber was 3 dpf 5mm polyethylene terephthalate.
[5] Viscosity at 60° C. - 1000 poise.

EXAMPLES 11–12

To 8 parts of 3 dpf 10 mm polypropylene staple fiber was added 6 parts of the fatty acid mixture of Example 1. This mass was tumbled until the acid was substantially uniformly distributed and adsorbed onto the fiber surface. This acid treated fiber was added to 86 parts of AC-20 asphalt. After thorough mixing, the filled asphalt was tensile tested at −18° C. as set forth hereinabove.

Simultaneously, there was prepared a similar mix containing 8 parts fiber, 8 parts fatty acid and 84 parts asphalt.

Physical properties of these specimens are reported in Table 2.

TABLE 2

| Example | % Acid | % Fiber | Elongation At Break | Tensile Strength |
|---|---|---|---|---|
| 11 | 6 | 8 | 40% | 730 |
| 12 | 8 | 8 | 59% | 950 |

What I claim and desire to protect by Letters Patent is:

1. An asphalt composition containing a reinforcing amount up to about 10% by weight of fibrous filler and (b) a fatty acid portion comprising a mixture of about 2.5 to 15% by weight of straight chain eighteen carbon unsaturated fatty acid and rosin in an active amount not exceeding about 30% by weight of the acid.

2. The composition of claim 1 wherein the fibrous filler is polypropylene staple fiber.

3. The composition of claim 1 containing about 2.5 to 10% by weight of eighteen carbon unsaturated fatty acid mixture.

4. The composition of claim 3 wherein fibrous filler comprises about 4 to 10% by weight polypropylene fiber.

5. The composition of claim 1 as a blend of polypropylene fibrous filler and an eighteen carbon fatty acid mixture wherein the ratio of fatty acid-to-fiber is between about 30/70 and 60/40 and the fatty acid is comprised of about 70 to 100% by weight of mono- and di-unsaturated acid.

* * * * *